United States Patent [19]

Katayama

[11] Patent Number: 4,572,020
[45] Date of Patent: Feb. 25, 1986

[54] SYNCHRONIZER OF TRANSMISSION FOR VEHICLES

[75] Inventor: Nobuaki Katayama, Toyota, Japan
[73] Assignee: Toyota Jidosha Kabushiki Kaisha, Toyota, Japan
[21] Appl. No.: 479,925
[22] Filed: Mar. 29, 1983
[30] Foreign Application Priority Data Feb. 17, 1983 [JP] Japan ................................ 58-22138

[51] Int. Cl.⁴ ........................ G05G 5/10; F16H 57/10; F16H 3/38
[52] U.S. Cl. .................................... 74/477; 74/411.5; 74/339; 192/4 C
[58] Field of Search ...................... 74/411.5, 477, 339; 192/4 A, 4 C

[56] References Cited

U.S. PATENT DOCUMENTS 3,545,295 12/1970 Ravello .................................. 74/339
3,939,724 2/1976 Takahashi et al. ............... 74/477 X
4,467,665 8/1984 Katayama et al. ............ 74/411.5 X

FOREIGN PATENT DOCUMENTS 137747 2/1981 Japan .

Primary Examiner—Rodney H. Bonck
Assistant Examiner—Stephen B. Andrews
Attorney, Agent, or Firm—Parkhurst & Oliff

[57] ABSTRACT

A synchronizer of transmission for vehicles such as an automobile has a double-mesh prevention member for permitting only one fork shaft to engage with a shift-and-select lever shaft. The gap in the engaging portion between the double-mesh prevention member and one of the forward fork shafts is selected to be greater than that between the double-mesh prevention member and the other forward fork shaft. When the shift-and-select lever shaft is operated for shifting to the reverse position, the forward fork shaft is moved by a distance corresponding to the difference in the size between the gaps mentioned above so that the synchronizer for forward transmission is put into effect to attain a synchronization between the input shaft and the output shaft.

2 Claims, 7 Drawing Figures

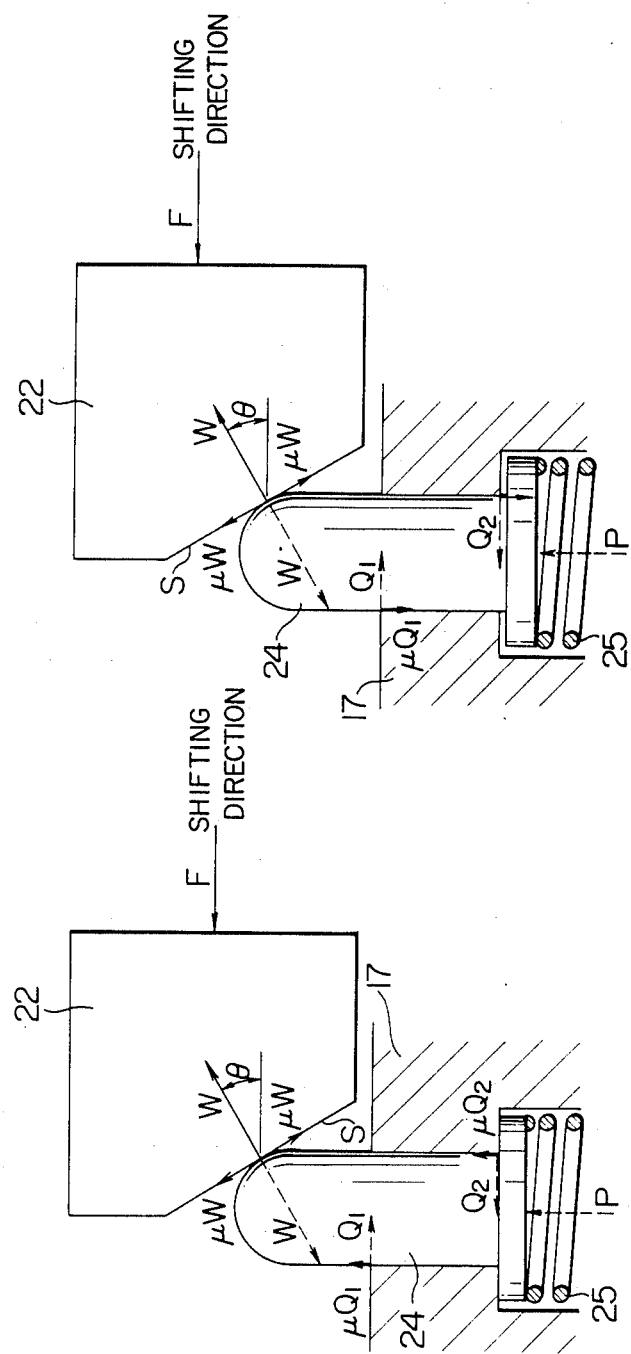

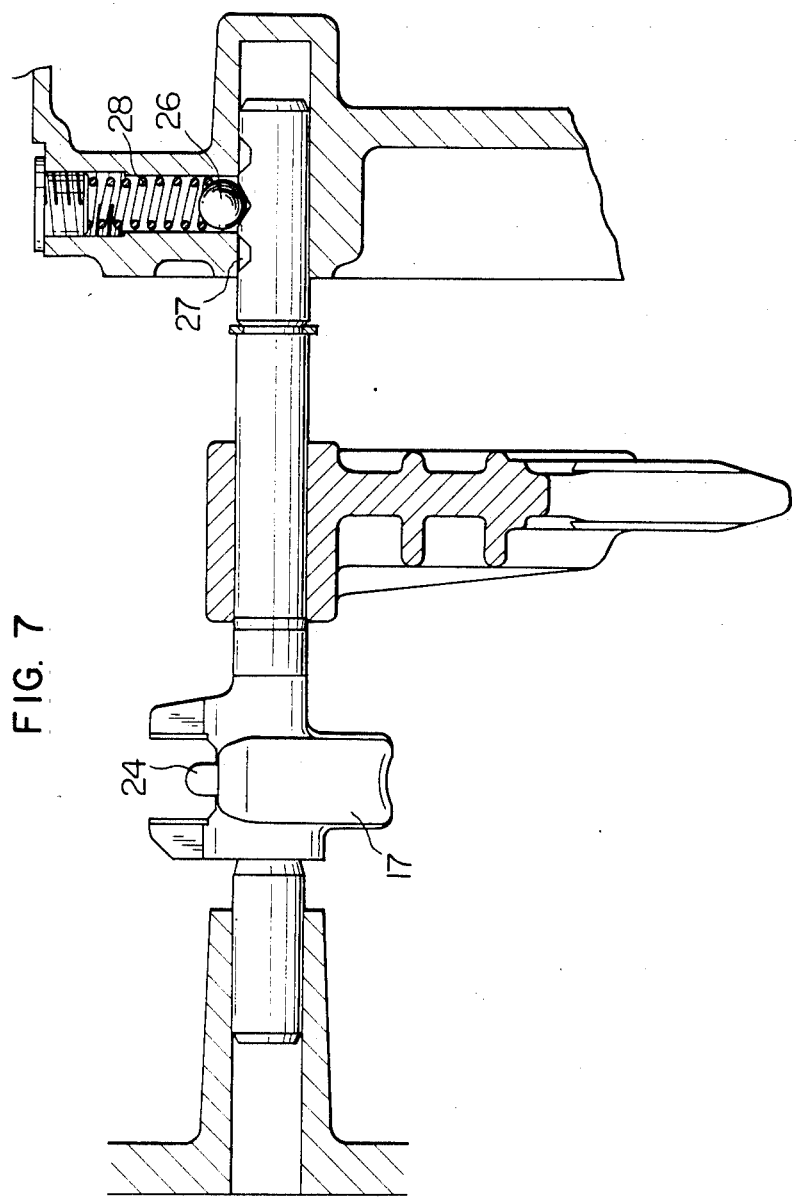

SYNCHRONIZER OF TRANSMISSION FOR VEHICLES

BACKGROUND OF THE INVENTION

The present invention relates to a synchronizer of transmission for vehicles and, more particularly, to a simplified synchronizer for reversing in manual transmission.

In general, no synchronizer is provided for the reverse operation of a transmission of an automobile or the like vehicle. Therefore, in quick shifting or in shifting to reverse position while the vehicle is running ahead at a low speed, the gears sound to unsmooth the shifting operation. On the other hand, it is a current tendency to decrease the internal resistance of transmission through reduction of the viscosity of lubricating oil and to decrease the drag torque by the use of antifriction bearings, in order to cope with demands for smaller manipulating force and reduction in fuel consumption. As a result, when the clutch is operated from on state to off state while the automobile is stopped with its transmission selecting the neutral state, the rotating shafts such as input shaft are not decelerated immediately so that gear sounds to unsmooth the shifting operation for reversing. In the transmission of the kind described, therefore, it is necessary to take a suitable countermeasure for obviating the problem of unsmooth shifting to reverse position.

If the reverse gear train is of synchromesh tupe, the above-mentioned problem will be overcome by applying a synchronizer similar to those of forward gears. This, however, is accompanied by the following two problems.

Firstly, it is to be pointed out that, since the reverse gear rotates in the direction opposite to the direction of rotation of the output shaft, an extremely high relative sliding rotation speed is developed between the reverse gear and the output shaft during forward running of the automobile. It is, therefore, necessary to pay specific attention and to take necessary measure for preventing seizure between the reverse gear and the output shaft, resulting in a raised cost of production uneconomically. Secondly, continuous meshing between the reverse gear and reverse idler gear causes various problems or inconveniences such as increased drag resistance in the transmission, generation of noises in the neutral state of the transmission, reduction in the efficiency, deterioration in the shift feeling due to an increase of the moment of inertia during shifting between forward gears and so forth. To obviate the problems arising from the continuous meshing between the reverse gear and reverse idler gear, it is preferred to adopt a selective sliding type reverse gear train in which the reverse idler gear or the reverse gear is slidable. This type of gear train, however, inconveniently necessitates various additional synchromesh parts such as synchronizer ring, shifting key and so forth.

SUMMARY OF THE INVENTION

Accordingly, it is an object of the invention to provide a synchronizer for the transmission of a vehicle, improved to overcome the above-described problems of the prior art.

To this end, briefly, the invention provides a synchronizer of the transmission for vehicles in which the shifting to reverse position is smoothed by making use of the synchromesh mechanism for forward gears, by adopting such an arrangement that the movement of the fork shaft for forward gear is limited by a double-mesh preventing member during shifting to reverse position so as to suppress the sounding of gears and to provide a better feel of shifting operation to reverse position.

More specifically, according to the invention, the gap preserved in the engaging portion between the double-mesh preventing member and the shift fork of one of the forward gears is selected to be greater than those in the engaging portions between the double-mesh preventing member and the shift forks of other forward gears, so that, during shifting to reverse position, the fork shaft of the forward gear is moved simultaneously by a distance corresponding to the difference in the gap so that the rotation of the input shaft is synchronized with the rotation of the output shaft by the functioning of the fork shaft for forward gear. It is, therefore, possible to easily attain the synchronization between the input shaft and the output shaft to ensure smooth and quick shifting to reverse position without unfavorable sound of gears. In addition, the deterioration of feeling of shift to the reverse position, attributable to the reduction in the drag torque and the use of oil having low viscosity, is avoided advantageously.

Other objects, features and advantages of the invention will become clear from the following description of the preferred embodiment taken in conjunction with the accompanying drawings.

BRIEF DESCRIPTION OF THE DRAWINGS

FIGS. 5 and 6 are illustrations of force developed between a cam and a pin; and

FIG. 7 is a sectional side elevational view of an essential part of a lock ball mechanism.

DESCRIPTION OF THE PREFERRED EMBODIMENTS

Figure 1:
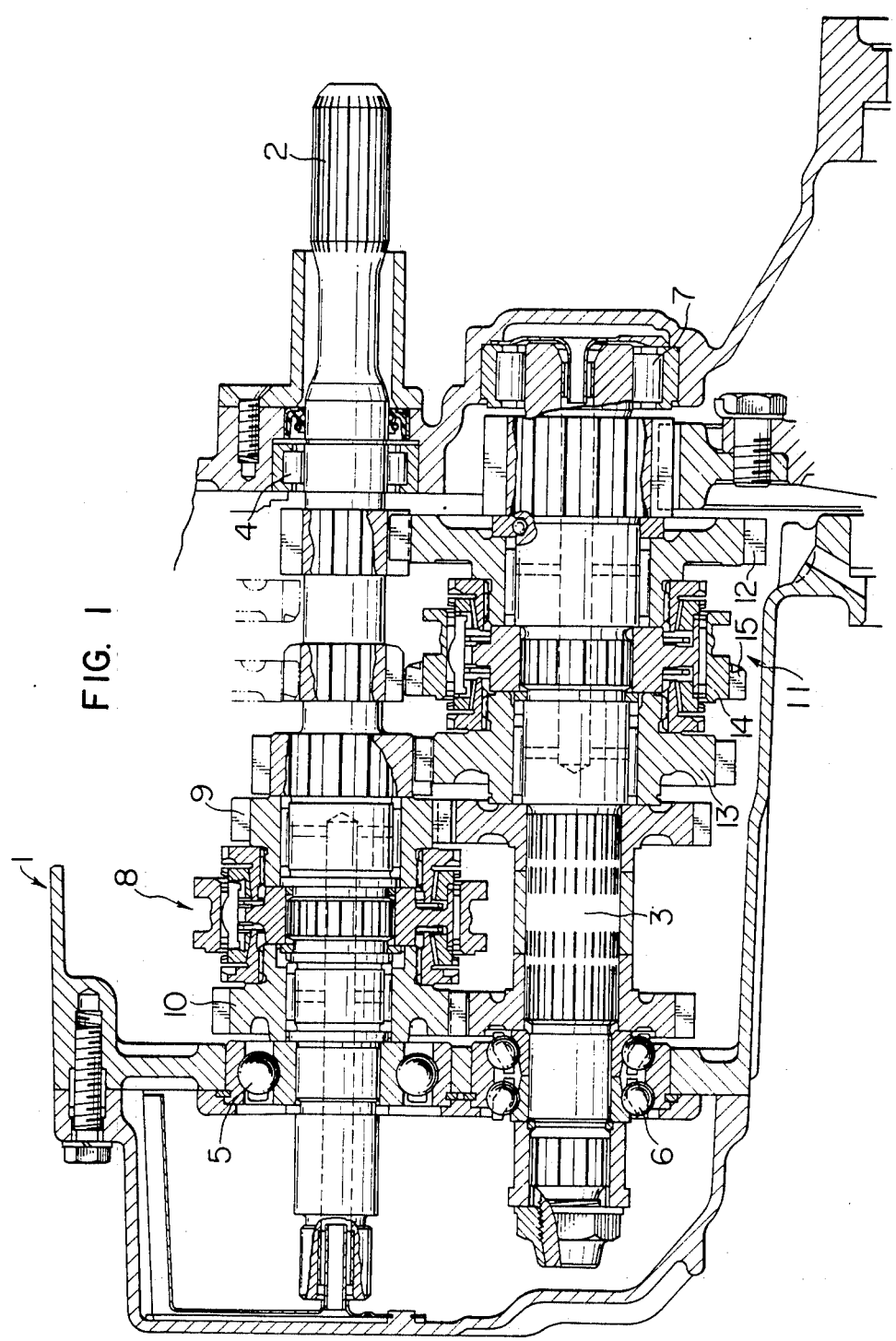
FIG. 1 is a sectional side elevational view of an essential part of a reverse selective sliding type transmission incorporating a synchronizer in accordance with the invention.

A preferred embodiment of the invention will be described hereinunder with reference to the accompanying drawings. A synchronizer embodying the present invention is applied to a manual transmission of so-called reverse selective sliding type having a slidable reverse idler gear, mounted on a front engine front drive type automobile. FIG. 1 shows the essential part of the manual transmission. The manual transmission has known gear trains consisting of four forward gears and one reverse gear and accomodated by a housing 1. An input shaft 2 and an output shaft 3 for carrying gear trains are disposed in parallel with each other and are supported by bearings 4 to 7. More specifically, the input shaft 2 carries a 3rd speed gear 9 and a 4th speed gear 10 which are arranged at both sides of a synchronizer 8. Similarly, the output shaft 3 carries a 1st speed gear 12 and a 2nd speed gear 13 which are disposed at both sides of a synchronizer 11. A reverse driven gear 15 is formed on a sleeve 14 which is a constituent of the synchronizer 11.

Figure 2:
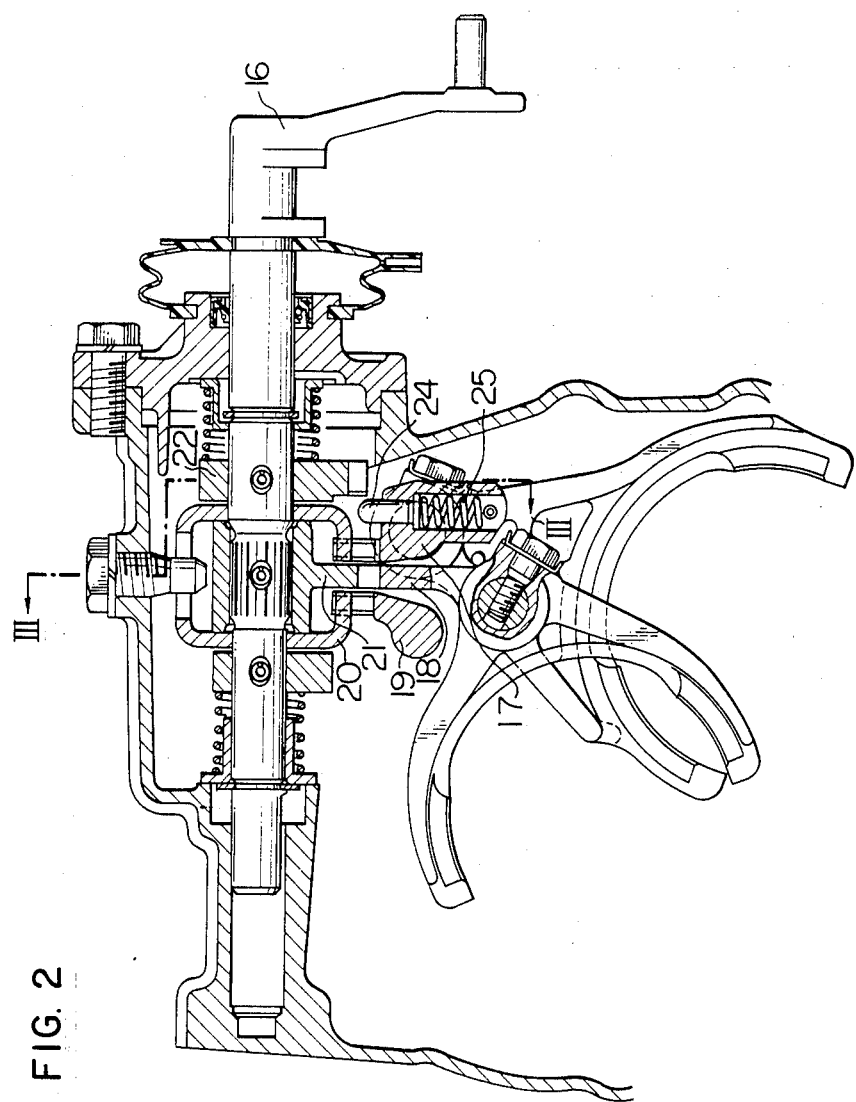
FIG. 2 is a sectional side elevational view of essential parts of a shift-and-select lever and a fork shaft.
Figure 3:
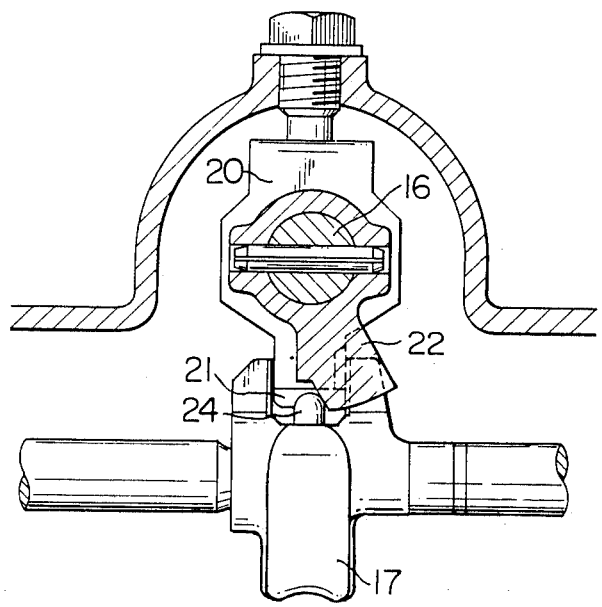
FIG. 3 is a sectional view taken along the line III—III of FIG. 2.
Figure 4:
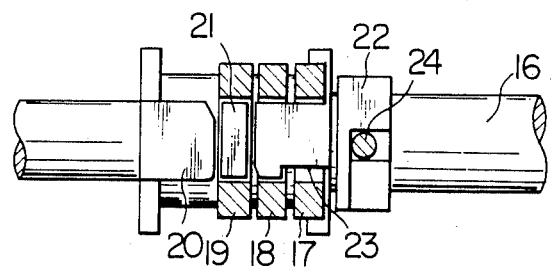
FIG. 4 is a bottom plan view showing the positional relationship between a double-mesh preventing member and other members such as fork shafts.

Referring to FIGS. 2 and 3, a shift-and-select lever 16 is adapted to be moved in the back and forth direction in the selecting operation and is rotated in the shifting operation so that a rotary member 21 on the shift-and-select lever shaft 16 is moved selectively into the groove in one of the 1st–2nd gear fork shaft 17, 3rd–4th gear fork shaft 18 and a reverse fork shaft 19 to move the selected fork shaft axially back and forth to effect the selection and shifting of the gear. The movement of each of the fork shafts 17, 18 and 19 is restricted by a double-mesh preventing member 20 provided on the shift-and-select lever shaft 16. More specifically, the rotary member 21 for driving the fork shaft and a cam 22 are fixed to the shift-and-select lever shaft 16. The double-mesh preventing member 20 functions to permit only one of the fork shafts to engage the rotary member 21 at a time. More specifically, in the state shown in FIG. 4, only the reverse fork shaft 19 is allowed to be driven by the rotary member 21. In this state, the double-mesh preventing member 20 is received by the recess 18 in the 3rd–4th gear shift fork 18 to prevent the latter from moving. In the state shown in FIG. 4, however, the width of the double-mesh preventing member 20 is reduced due to the presence of a step 23 so that the 1st–2nd gear shift fork 17 is allowed to move by a distance corresponding to the reduction of the width provided by the step 23. Therefore, when the shift-and-select lever shaft 16 is operated for shifting to the reversing position, the 1st–2nd gear shift fork is moved by the above-mentioned distance. The 1st–2nd gear fork shaft 17 on the other hand slidably carries a pin 24 which is adapted to be depressed by a cam 22 overcoming the force of a spring 25. Therefore, the 1st–2nd gear fork shaft 17 is moved by the distance corresponding to the height of the step in the double-mesh preventing member 20, as a result of rotation of the cam 22. A further rotation of the cam 22, however, causes only a depression of the pin 24 but does not cause the movement of the 1st–2nd gear fork shaft 17.

The condition of contact between the cam 22 and the pin 24 is determined as follows, in order to attain the above-mentioned operation of the fork shaft 17.

FIG. 5 shows the relation of force which is produced when a force is applied to the cam 22, in which F represents the force acting on the cam 22, W represents the normal force acting on the point of the contact between the cam and the pin, $Q_1$ and $Q_2$ represent normal forces exerted by the walls on the pin, P represents the spring force, and H represents the coefficient of friction. The full-line arrows and broken-line arrows indicate, respectively, the forces acting on the cam and pin, respectively.

The following formulae (1) to (3) are derived from the condition of balance of the forces acting on the cam 22.

$$F = W \cos \theta + \mu W \sin \theta \qquad (1)$$
$$= W(\cos \theta + \mu \sin \theta)$$

$$P = W \sin \theta + \mu W \cos \theta - \mu (Q_1 + Q_2) \qquad (2)$$
$$= W(\sin \theta + \mu \cos \theta) - \mu (Q_1 + Q_2)$$

$$Q_1 - Q_2 = W \cos \theta + \mu W \sin \theta \qquad (3)$$
$$= W(\cos \theta + \mu \sin \theta) = F$$

The following formula (4) is derived from formula (1).

$$W = \frac{F}{\cos \theta + \mu \sin \theta} \qquad (4)$$

The following formula (5) is obtained by substituting formula (4) for W in the formula (2).

$$P = \frac{\sin \theta - \mu \cos \theta}{\cos \theta + \mu \sin \theta} F - \mu (Q_1 + Q_2) \qquad (5)$$

It is essential that the following condition is met, in order to move the fork shaft.

$$P > \frac{\sin \theta - \mu \cos \theta}{\cos \theta + \mu \sin \theta} F - \mu (Q_1 + Q_2)$$

FIG. 6 shows the relationships of forces as observed when the spring force P is applied to the pin 24.

The following formula (6) is derived from the condition of balance of forces acting on the cam.

$$F = W \cos \theta - \mu W \sin \theta \qquad (6)$$
$$= W(\cos \theta - \mu \sin \theta)$$

Also, the following formulae (7) and (8) are derived from the condition of balance of forces acting on the pin 24.

$$P = W \sin \theta + \mu W \cos \theta + \mu (Q_1 + Q_2) \qquad (7)$$
$$= W(\sin \theta + \mu \cos \theta) + \mu (Q_1 + Q_2)$$

$$Q_1 - Q_2 = W \cos \theta - \mu W \sin \theta \qquad (8)$$
$$= W(\cos \theta - \mu \sin \theta) = F$$

The formula (6) can be transformed as formula (9) below.

$$W = \frac{F}{\cos \theta - \mu \sin \theta} \qquad (9)$$

The following formula (10) is obtained by substituting formula (9) for W in formula (7).

$$P = \frac{\sin \theta + \mu \cos \theta}{\cos \theta - \mu \sin \theta} F + \mu (Q_1 + Q_2) \qquad (10)$$

In order that the fork shaft may not be moved, therefore, it is essential that the following condition is met.

$$P < \frac{\sin \theta + \mu \cos \theta}{\cos \theta - \mu \sin \theta} F + \mu (Q_1 + Q_2)$$

From the two conditions mentioned above, it is understood that the spring load P should be selected to meet the condition expressed by the following formula (11).

$$\frac{\sin \theta - \mu \cos \theta}{\cos \theta + \mu \sin \theta} F - \qquad (11)$$

$$\mu(Q_1 + Q_2) < P < \frac{\sin \theta + \mu \cos \theta}{\cos \theta - \mu \sin \theta} F + \mu (Q_1 + Q_2)$$

The term $\mu (Q_1 + Q_2)$ is considered as being the sliding resistance encountered by the pin. The allowable range of the value of spring load P is expanded to facilitate the design as the value of this term is increased.

Assume here the most severe condition, i.e. the resistance expressed by $\mu (Q_1+Q_2)$ is zero.

In such a case, the formula (11) is reformed as follows.

$$\frac{\sin \theta + \mu \cos \theta}{\cos \theta + \mu \sin \theta} F < P < \frac{\sin \theta + \mu \cos \theta}{\cos \theta - \mu \sin \theta} F$$

$$\frac{\tan \theta - \mu}{1 + \mu \tan \theta} F < P < \frac{\tan \theta + \mu}{1 - \mu \tan \theta} F$$

As the shift-and-select lever shaft is operated for shifting to the reverse position, the reverse fork shaft 19 is moved axially by the rotary member 21 and, at the same time, the 1st–2nd gear fork shaft 17 is moved by a distance corresponding to the height of the step in the double-mesh preventing member 20.

As a result, the 1st–2nd gear fork shaft 17 operates the synchronizer 11 shown in FIG. 1 to promote the synchronization between the rotation of the input shaft 2 and the output shaft 3. Then, as the shifting operation to the reverse position is continued, the 1st–2nd gear fork shaft 17 is stopped by the double-mesh prevention member 20 and, thereafter, the pin 24 is depressed by the cam 22 so that the shifting to the reverse position is continued and completed while leaving the 1st–2nd gear fork shaft at the stopped position.

As will be seen from FIG. 7, the 1st–2nd gear fork shaft 17 is provided at its one end with grooves 27 for receiving a lock ball 26 which is urged by a spring 28. Therefore, the fork shaft 17 is automatically returned to the neutral position by the resetting force produced by the lock ball 26 urged by the spring 28 even when it is moved by the distance corresponding to the height of the step in the double-mesh prevention member 20. It will be clear to those skilled in the art that this arrangement prevents synchromesh operation during reversing.

In the described embodiment, the synchronizer of the invention is applied to a reverse selective slide type transmission in which the reverse idler gear is slided selectively. The invention, however, can be equally applied to a so-called reverse synchromesh transmission in which a reverse counter gear, reverse idler gear and the reverse gear are continuously held in meshing condition to permit reversing with a switching device having no synchronizer. The invention is applicable also to a transmission of reverse gear selective sliding type in which the reverse gear is selectively slided into engagement with the reverse idler gear which continuously meshes with a reverse counter gear, and even to a transmission of a type in which the shift fork shaft is directly operated by the shift lever without the medium of the shift-and-select lever integral with the intermediate rod.

Although the invention has been described through specific terms, it is to be noted here that the described embodiment is not exclusive and various changes and modifications may be imparted thereto without departing from the scope of the invention which is limited solely by the appended claims.

What is claimed is:

1. A synchronizer of a transmission for vehicles comprising:
   a double-mesh prevention member provided on a shift-and-select lever shaft and adapted to restrict the movement of fork shafts of the transmission, the double-mesh prevention member having at least two engaging portions for engaging first and second forward fork shafts, a first gap between said first engaging portion and said first forward fork shaft being greater than a second gap between said second engaging portion and said second forward fork shaft;
   a pin carried by said first forward fork shaft and biased substantially radially outwardly from said first forward fork shaft by resilient means; and
   a cam provided on said shift-and-select lever shaft, said cam being shaped and adapted to engage said pin, when said shift-and-select lever shaft is operated to shift to the reverse position, to press said pin so as to move said first forward fork shaft axially until said first forward fork shaft engages said first engaging portion, and thereafter to press said pin radially into said first forward fork shaft;
   whereby, upon shifting to the reverse position, said first forward fork shaft is moved by said pin and cam to put a synchronizer for forward gears into effect, thereby to attain synchronization between an input shaft and an output shaft of the transmission, but is prevented by said first engaging portion from moving far enough to engage a forward gear.

2. The synchronizer of claim 1, wherein said double-mesh prevention member comprises a substantially C-shaped member, the open ends of which serve as said two engaging portions.

* * * * *